United States Patent
Linkenbach

(10) Patent No.: US 6,374,857 B1
(45) Date of Patent: Apr. 23, 2002

(54) VALVE ASSEMBLY

(75) Inventor: Steffen Linkenbach, Eschborn (DE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/463,337

(22) PCT Filed: Jul. 21, 1998

(86) PCT No.: PCT/EP98/04512

§ 371 Date: Apr. 21, 2000

§ 102(e) Date: Apr. 21, 2000

(87) PCT Pub. No.: WO99/05010

PCT Pub. Date: Feb. 4, 1999

(30) Foreign Application Priority Data

Jul. 22, 1997 (DE) ......................................... 197 31 417

(51) Int. Cl.[7] ............................................. F15B 13/044
(52) U.S. Cl. ................................. 137/627.5; 137/596.17
(58) Field of Search ........................... 137/596.17, 627.5

(56) References Cited

U.S. PATENT DOCUMENTS

| | | |
|---|---|---|
| 2,735,268 A | 2/1956 | Stelzer |
| 2,812,776 A | 11/1957 | Lofftus et al. |
| 2,846,031 A | 8/1958 | Kelley |
| 2,867,307 A | 1/1959 | Ingres |
| 3,452,781 A * | 7/1969 | Napolitano ............... 137/627.5 |
| 3,538,954 A * | 11/1970 | Fagerlie et al. ......... 137/625.65 |
| 3,605,813 A * | 9/1971 | Nakano et al. .......... 137/627.5 |
| 4,128,113 A * | 12/1978 | Hart ......................... 137/627.5 |
| 4,190,081 A * | 2/1980 | Coles ................ 137/625.65 X |
| 4,678,006 A * | 7/1987 | Northman et al. .. 137/625.65 X |
| 4,778,225 A | 10/1988 | Rudolph et al. |
| 4,922,965 A | 5/1990 | Meister |
| 5,007,458 A | 4/1991 | Marcus et al. |
| 5,046,530 A * | 9/1991 | Gossner et al. ......... 137/596.17 |
| 5,682,918 A * | 11/1997 | Stoll et al. ........... 137/627.5 X |

FOREIGN PATENT DOCUMENTS

| | | |
|---|---|---|
| CH | 679 327 | 7/1991 |
| DE | 5 19 500 | 2/1931 |
| DE | 5 23 563 | 4/1931 |
| DE | 1 252 027 | 10/1967 |
| DE | 1 927 792 | 12/1970 |
| DE | 1 780 398 | 4/1972 |
| DE | 25 17 907 | 11/1976 |
| DE | 28 15 735 | 10/1979 |
| DE | 35 27 257 | 2/1987 |
| DE | 36 25 815 | 2/1988 |
| DE | 39 43 003 | 7/1991 |
| DE | 43 37 361 | 5/1995 |
| EP | 0 085 298 | 8/1983 |

OTHER PUBLICATIONS

Search Report of the German Patent Office for Application No. 197 31 417.1.

Backe, W.: "Umdruck zur Borsesung—Grundlagen der Pneumatik", *Institute for Hydraulic and Pneumatic Driving and Steering*, 7th Edition, 1986, pp. 81–85; photo 5–3.

* cited by examiner

*Primary Examiner*—Gerald A. Michalsky
(74) *Attorney, Agent, or Firm*—Rader, Fishman & Grauer PLLC

(57) ABSTRACT

The present invention discloses a valve assembly for controlling a differential pressure, including a housing, an actuating device, a first, a second, and a third port, a first sealing seat, a second sealing seat, and a valve member whose interaction with the first sealing seat controls a first connection between the first and the second port, and whose interaction with the second sealing seat controls a second connection between the second and the third port. In order to ensure an optimal analog controllability, according to the present invention, the sealing seats are axially opposite each other and have equal effective diameters, and the valve member is arranged between the sealing seats.

10 Claims, 2 Drawing Sheets

VALVE ASSEMBLY

TECHNICAL FIELD

The present invention relates to valve assemblies and more particularly relates to a valve assembly for controlling a differential pressure.

BACKGROUND OF THE INVENTION

A preferably pneumatic valve assembly of this type which is used especially for controlling the differential pressure in vacuum brake force boosters of automotive vehicle brake systems is disclosed in German published patent application No. 39 43 003. The three-way/three-position directional control valve disclosed in this application has two coaxially arranged sealing seats which cooperate with a sealing surface of an elastic valve member. The first sealing seat which is interposed between the first and the second port in terms of effect is designed on a valve piston that is elastically suspended in a valve housing. The valve piston is axially displaceable in the direction of the valve member by means of an electromagnet. The second sealing seat which is inserted between the second and the third port in terms of effect is provided in the interior of the valve housing. The valve piston houses an actuating sleeve which is arranged coaxially relative to the first sealing seat, is captivated preferably on the valve piston and movable into a force-transmitting connection with the valve member. The prior art valve suffers from the disadvantage of an abrupt rise of the actuating force which is to be produced by the electromagnet in the presence of a predeterminable travel of the valve piston. This abrupt rise of the actuating force is due to the effect of a pressure difference acting on an annular surface on the sealing surface limited by the two sealing seats and exerts an adverse influence on the controllability of a valve of this type. Another shortcoming is the comparatively high magnetic force level which is induced by the above-mentioned abrupt rise in force and requires high current values for the actuation of the electromagnet.

Therefore, an object of the present invention is to provide a valve assembly of the type mentioned hereinabove which operates on a low level of force which is to be produced by an actuator and the controllability of which is ensured without problems. Another objective is that the valve assembly is easy to manufacture in series production and comprises individual components which are inexpensive to make, thereby avoiding complicated manufacturing measures to the extent possible.

According to the present invention, this object is achieved because the sealing seats are arranged axially opposite each other and have equal effective diameters, and because the valve member is arranged between the sealing seats.

DETAILED DESCRIPTION OF THE PREFERRED EMBODIMENTS

Figure 1:
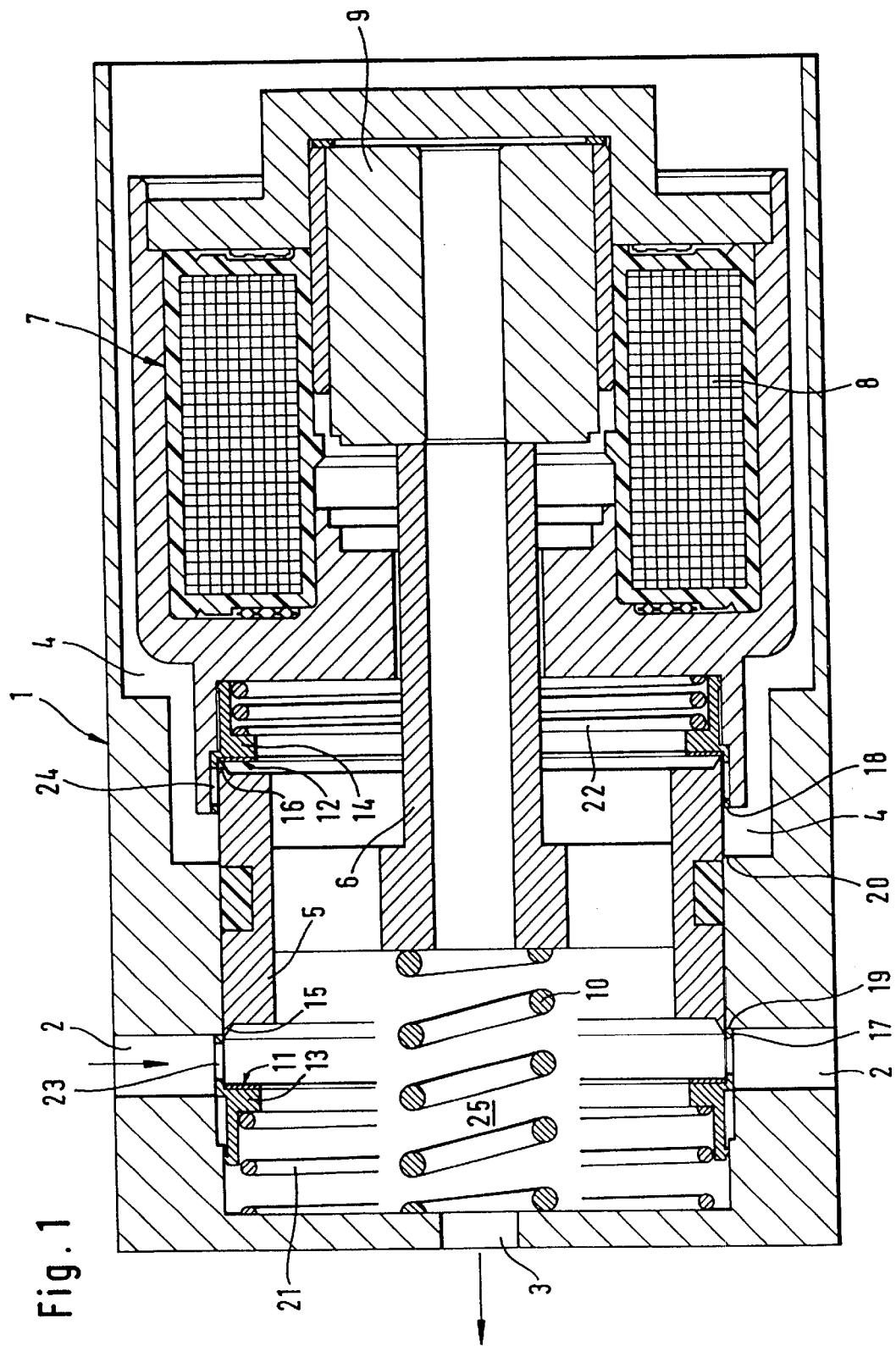
FIG. 1 is a schematic cross-section taken through a first design of the valve assembly of the present invention in an inoperative state.

The valve assembly of an electronically controllable brake force booster which is schematically shown in the attached drawing has a generally rotation-symmetrical design and includes a housing 1 which has a first port 2, a second port 3, and a third port 4. The first port 2 is associated with a vacuum chamber (not shown) of the brake force booster that is connected to an appropriate vacuum source. The second port 3 opens into a working chamber (which is also not shown), and the third port 4 serves for the supply of the ambient atmosphere. In the interior of the housing 1, a plate-shaped valve member 5 is axially slidably arranged which is operable by an electromagnetic actuating device 7 by way of a tubular extension 6. The electromagnetic actuating device 7 comprises a coil 8 and an armature 9 on which the above-mentioned extension 6 abuts under bias of a first spring 10. In this arrangement, the valve member 5 is favorably arranged between a first sealing seat 11 and a second sealing seat 12 which are provided on each one sleeve 13, 14 that is slidable within limits in the housing 1. The two sealing seats 11, 12 are provided by each one sealing surface made of an elastic material and cooperate with each one preferably annular sealing edge 15, 16 on the valve member 5, and the arrangement is preferably made so that the sealing edges 15, 16 have the same diameter. The sleeves 13, 14 include each one annular collar 17, 18 which is movable into abutment with each one stop 19, 20 configured in housing 1. An axial preload of the sleeves 13, 14 in the direction of the stop 19, 20 is applied by each spring 21, 22. Openings 23, 24 are furnished in the collars in order to provide optimal flow conditions both during evacuation and ventilation of the working chamber (not shown) of the brake force booster connected to the second port 3.

In the inactive position of the valve device of the present invention shown in FIG. 1, or when the electromagnetic actuating device 7 is inoperative, the first sleeve 13 bears against the stop 19, biased by spring 21, that means at an axial distance from the sealing edge 15 so that a pneumatic connection exists between the first port 2 and the second port 3 and leads through the interior 25 of the housing 1. The second sealing surface bears against the annular sealing edge 16 of the valve member 5 under the bias of the second spring 22 so that the second sealing seat 12 and, thus, the third port 4 are closed.

When electric current is applied to the coil 8, a force, directed to the left in the drawing, is exerted on the armature 9 and causes axial displacement of the valve member 5 towards the first sealing seat 11. Biased by spring 22, the second sealing seat 12 follows the movement of the valve member 5 until the collar 18 of the second sleeve 14 moves into abutment with the stop 20. Upon continued movement of the valve member 5 to the left, the sealing edge 15 moves into abutment with the first sealing surface so that the first sealing seat 11 is closed and the connection between the first port 2 and the second port 3 is interrupted. The condition in which both sealing seats 11, 12 are closed is referred to as 'pneumatic pressure retaining phase'.

Upon an increase of the current which flows through the coil 8, the first sleeve 13 is moved to the left in opposition to the spring 21, and the second sealing edge 16 is lifted from the second sealing seat 12. Opening of the second sealing seat 12 causes opening of a connection between the second port 3 and the third port 4 so that the above-mentioned (non-illustrated) working chamber of the brake force booster is ventilated. The condition of pressure increase in the working chamber is referred to as 'pneumatic pressure increasing phase'.

However, when the current supplied to the coil 8 is decreased, starting from the 'pressure retaining phase', the armature 9 and, thus, the valve member 5 are moved to the right, as viewed in the drawing, under the effect of the first compression spring 10. During this movement, the second sleeve 14 is displaced in opposition to the effect of the spring 22, into the position shown in FIG. 1, and the first sealing edge 15 is lifted from the first sealing surface, and the first sealing seat 11 is opened. The result is that the connection between the ports 2 and 3 is opened so that there occurs evacuation of the working chamber and, thus, decrease of the pressure prevailing therein. The condition of the pressure decrease in the working chamber is referred to as 'pneumatic pressure decreasing phase'.

The magnetic force which acts upon the armature 9 is a function of the current which flows through the coil 8. By variation of the current supplied to the coil 8, the position of the armature 9 in the axial direction of the valve assembly can be adjusted so that any pressure variation desired can be adjusted by a defined alternation between increasing, retaining and decreasing phase. The energization of coil 8 can be effected by appropriate signals which are produced by an electric control unit (not shown).

Figure 2:
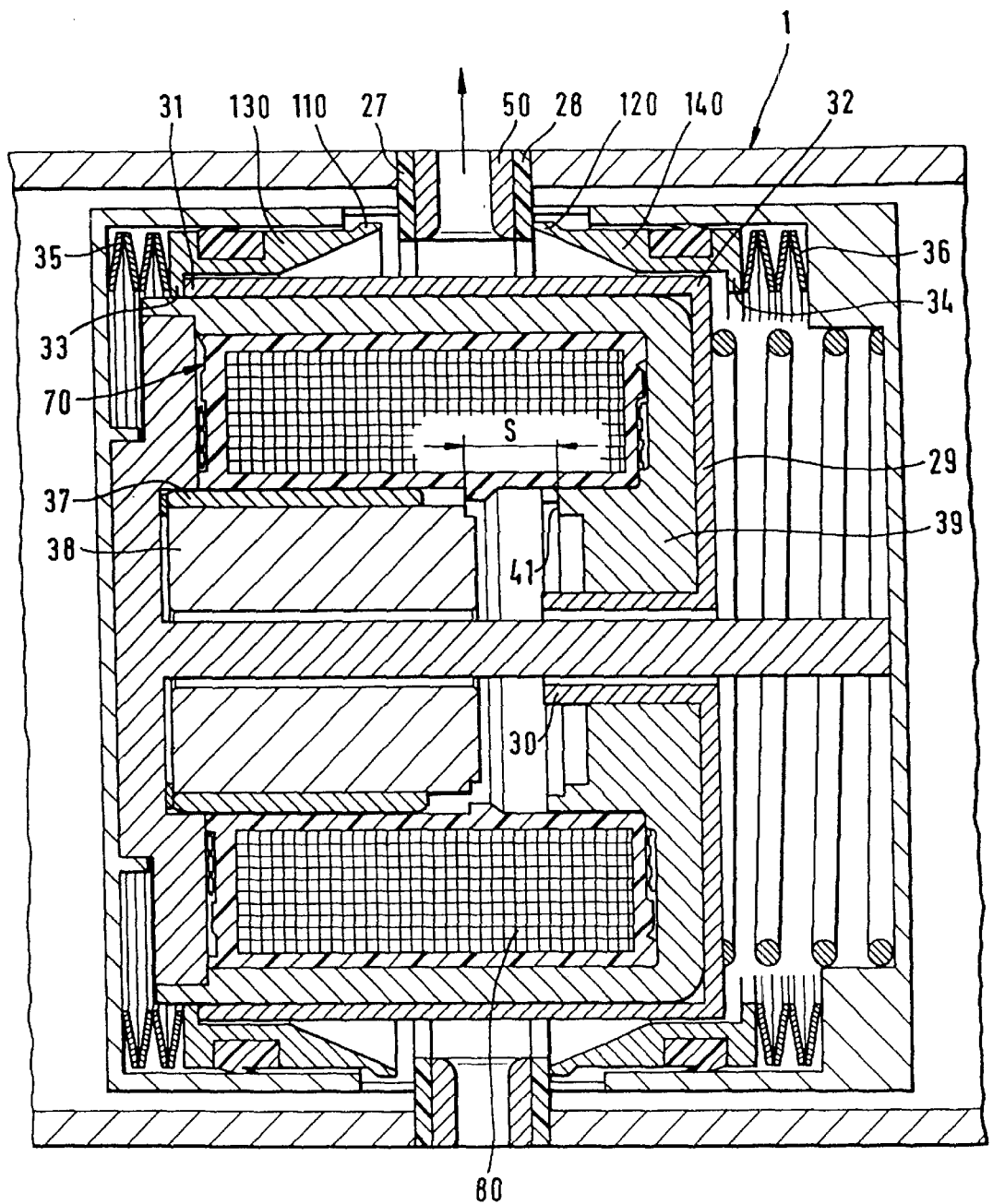
FIG. 2 is a view of a second design of the valve assembly of the present invention in a representation which corresponds to FIG. 1.

In the second design variation of the subject matter of the present invention as shown in the embodiment of FIG. 2. In FIG. 2 a valve member 50 is stationarily arranged in the valve housing 1 and has two opposed sealing surfaces 27, 28 which cooperate with the above-mentioned sealing seats, that have been assigned reference numerals 110, 120 in FIG. 2. The valve assembly shown in FIG. 2 is actuated by way of a bowl-shaped actuating element 29 which is movable into engagement with an armature 38 of an electromagnetic actuating device 70, on the one hand, and with sleeves 130, 140 which form sealing seats 110, 120, on the other hand, with a view to the axial displacement of the sleeves with respect to a stationary valve member 50. The transmission of force between the armature 38 and the actuating element 29 is carried out by means of a tubular, radially inward axial extension 30 that is spaced axially from the armature 38. A variation of the distance between armature 38 and extension 30 permits adjusting the desired magnetic force level which is required in the operation of the valve assembly of the present invention. The force is transmitted between the actuating element 29 and the sleeves 130, 140 by way of radially outward areas 31, 32 of the actuating element 29 which have each one radially inwardly directed collar 33, 34 provided on the sleeve 130 or 140. The preload of the sleeves 130, 140 in the direction of the valve member 50, which is necessary for a proper functioning, is applied by springs or poppet spring units 35, 36. Preferably, the rating of the parts 130, 140 and 50 is chosen so that, in the inactive position, the first sealing seat 110 is retained on the sleeve 130 by abutment of its collar 33 on the actuating element 29 or 31 at an axial distance from the valve member 50, while the second sealing seat 120 is in sealing abutment with the valve member 50 by way of the above-mentioned preload of the second sleeve 140, and the radial collar 34 of the second sleeve 140 is out of engagement from the actuating element 29 or 32.

The armature 38 of the design shown in FIG. 2 is favorably supported in a bearing bush or slide bush 37 having an axial overall length which is smaller than that one of the armature 38. The armature 38 cooperates with a stop 41, and the distance between the armature end, shown on the right in the drawing, and the stop 41 corresponds to the actuating travel S of the armature 38.

What is claimed is:

1. A valve assembly for controlling a differential pressure, comprising:
   a valve housing,
   an actuating device disposed within the valve housing,
   an actuating element movable into engagement with the actuating device,
   a first resiliently biased sleeve slidable in the valve housing and including a first sealing seat,
   a second resiliently biased sleeve slidable in the valve housing and including a second sealing seat, the second sealing seat arranged axially opposite the first sealing seat, and
   a valve member stationarily arranged in the valve housing between the first and second sealing seats, the first sealing seat interacting with the valve member to control a first connection between a first port and a second port, the second sealing seat interacting with the valve member to control a second connection between the second port and a third port,
   wherein one of the first and second sealing seats engages the actuating element and is separated from the valve member when the valve assembly is in an inactive position, and wherein the other one of the first and second sealing seats engages the actuating element and is separated from the valve member when the valve assembly is in an active position,
   wherein the actuating element is of a bowl-shaped configuration including a first outward area and a second outward area, and wherein the first sleeve includes a first collar opposite the first sealing seat and a second collar opposite the second sealing seat.

2. The valve assembly according to claim 1, wherein the actuating device comprises an electromagnet having an armature.

3. The valve assembly according to claim 2, wherein the actuating element including an extension for engaging the armature of the electromagnet and causing the resiliently biased first and second sealing seats to engage the valve member.

4. The valve assembly according to claim 3, wherein an amount force exerted by the electromagnetic during operation of the valve assembly is adjusted by a distance between the extension of the actuating element and the armature of the electromagnetic.

5. The valve assembly according to claim 4, further including a stop that cooperates with the armature of the electromagnet.

6. The valve assembly according to claim 5, wherein a distance between the armature and the stop corresponds to an actuating travel, S, of the valve assembly.

7. Valve assembly as claimed in claim 2, wherein the armature of the electromagnet is supported by one of a bearing bush and a slide bush.

8. Valve assembly as claimed in claim 1, wherein the valve member is configured as part of one of the first, second and third ports.

9. The valve assembly according to claim 1, wherein the first outward area of the actuating element engages the first collar of the first sleeve when the valve assembly is in the inactive position, and wherein the second outward area of the actuating element engages the second collar of the second sleeve when the valve assembly is in the active position.

10. The valve assembly according to claim 1, wherein the second sealing surface sealingly engages the second sealing seat when the valve assembly is in the inactive position.

* * * * *